(12) United States Patent
Prince

(10) Patent No.: US 11,057,205 B2
(45) Date of Patent: Jul. 6, 2021

(54) SEED KEY EXPANSION METHOD AND ITS USES

(71) Applicant: Marc Leo Prince, Ottawa (CA)

(72) Inventor: Marc Leo Prince, Ottawa (CA)

( * ) Notice: Subject to any disclaimer, the term of this patent is extended or adjusted under 35 U.S.C. 154(b) by 152 days.

(21) Appl. No.: 16/209,956

(22) Filed: Dec. 4, 2018

(65) Prior Publication Data

US 2020/0177380 A1 Jun. 4, 2020

Related U.S. Application Data

(60) Provisional application No. 62/594,667, filed on Dec. 5, 2017.

(51) Int. Cl.
*H04L 9/08* (2006.01)
*H04L 9/06* (2006.01)

(52) U.S. Cl.
CPC .......... *H04L 9/0869* (2013.01); *H04L 9/0618* (2013.01); *H04L 9/0894* (2013.01)

(58) Field of Classification Search
None
See application file for complete search history.

(56) References Cited

U.S. PATENT DOCUMENTS

| | | | | |
|---|---|---|---|---|
| 5,150,411 A | * | 9/1992 | Maurer | H04L 9/0844 380/282 |
| 5,218,637 A | * | 6/1993 | Angebaud | G06Q 20/341 705/67 |
| 6,707,914 B1 | * | 3/2004 | Bell | H04L 9/12 380/265 |
| 2004/0202317 A1 | * | 10/2004 | Demjanenko | G06F 9/30007 380/28 |
| 2017/0093562 A1 | * | 3/2017 | Satpathy | H04L 9/0631 |

* cited by examiner

*Primary Examiner* — Kaveh Abrishamkar

(57) ABSTRACT

A seed key is expanded using a base primitive scheme. The first x bits of a seed key are used to determine a count number. These first x bits of the seed key are rotated from the front of the seed key to the back of the seed key. A pointer is then moved down the seed key a number of places corresponding to the count number. A specific bit pointed to by the pointer is then removed from the seed key and placed in the expanded key. After the deletion, the bit pointed to by the pointer is considered the front of the seed key and the process repeats until all the bits have been extracted and placed in the expanded key. These count numbers are also used to determine the specific bits to be removed from the plain text block and inserted into the cipher text block.

10 Claims, 10 Drawing Sheets

SEED KEY EXPANSION METHOD AND ITS USES

TECHNICAL FIELD

The present invention relates to cryptography. More specifically, the present invention relates to a cryptographic system based on an internal entropy of a seed key.

CROSS-REFERENCE TO RELATED APPLICATIONS

Please refer to Application No. 62/594,667 with a filing date of Dec. 5, 2017.

BACKGROUND

The rise of the information age has led to countless advantages in our daily lives. We can now communicate with people on the other side of the world as well as shop, bank, and conduct business without leaving the comfort of our homes. One backbone of this information age is encryption. Without encryption, all of our digital activities would be open to everyone who can intercept our digital communications.

Practically all digital communications in today's world is encrypted in one form or another. Such encryption typically comes at a cost in computational power—generally speaking, the more secure an encryption scheme is, the more computational power is required.

One possible issue with current cryptographic or encryption schemes is that the creation of keys based on one or more seed keys may result in degenerated keys (e.g. keys having all ones or all zeroes). There is therefore a need for systems, methods, and devices that provides suitably secure encryption while not requiring inordinate amounts of computing resources and which does not result in degenerate (and thereby insecure) keys.

SUMMARY

The present invention provides systems and methods for generating encryption schemes from seed keys. A seed key is expanded into multiple expanded keys using a base primitive scheme. The first x bits of a seed key are used to determine a count number. In determining this count number, these first x bits of the seed key are rotated from the front of the seed key to the back of the seed key. A pointer is then moved down the seed key a number of places corresponding to the count number. A specific bit pointed to by the pointer is then extracted and deleted from the seed key and placed in the expanded key. After the deletion, the bit pointed to by the pointer is considered the front of the seed key and the process repeats until all the bits have been extracted, deleted, and placed in the expanded key. In addition, these count numbers are used to determine the specific bits to be removed from the plain text block and inserted into the cipher text block.

In a first aspect, the present invention provides a method for producing a binary expansion key from a binary seed key, the method comprising:
  a) storing said seed key in an ordered sequential data structure;
  b) pointing a pointer at a front of said data structure;
  c) reading a first a bits of said seed key from said front of said seed key to determine a count number, a being a natural number;
  d) shifting the first a bits from said front to a back of said data structure;
  e) moving said pointer cn positions along said data structure, cn being equal to said count number;
  f) moving said pointer another position along said data structure;
  g) extracting a bit pointed to by said pointer and placing said bit into an expansion key;
  h) removing a bit extracted in step g) from said data structure and to thereby move said pointer one more position in said data structure;
  i) defining a bit pointed to by said pointer as said front of said data structure;
  j) repeating steps c)-i) until all bits in said data structure have been extracted from said seed key and placed into said expansion key;
wherein when executing step e), a count to said cn positions begins said count from 0.

In a second aspect, the present invention provides a method for transforming a binary plain text block into a binary cipher text block by utilizing the count numbers generated by expanding a binary seed key into a binary expansion key, the method comprising:
  a) determining a count number based on a subset of bits from said binary seed key;
  b) using said count number determined in step a) to determine a specific bit b1 to be extracted from said binary seed key;
  c) also using said count number determined in step a) to determine a specific bit b2 to be extracted from said binary plain text block;
  d) extracting and removing said specific bit b1 from said binary seed key;
  e) extracting and removing said specific bit b2 from said binary plain text block;
  f) placing said specific bit b1 into said binary expansion key;
  g) placing said specific bit b2 into said binary cipher text block;
  h) repeating steps a)-g) until all bits in said binary plain text block have been removed and placed into said binary cipher text block.

In a third aspect, the present invention provides computer readable media having encoded thereon computer readable and computer executable code which, when executed, implements a method for expanding a binary seed key into a binary expansion key, the method comprising:
  a) determining a count number based on a subset of bits from said seed key;
  b) using said count number determined in step a) to determine a specific bit to be extracted from said seed key;
  c) extracting and removing said specific bit from said seed key;
  d) placing said specific bit into said expansion key;
  e) repeating steps a)-d) until all bits in said seed key have been removed and placed in said expansion key.

BRIEF DESCRIPTION OF THE DRAWINGS

The embodiments of the present invention will now be described by reference to the following figures, in which identical reference numerals in different figures indicate identical elements and in which:

FIGS. 2A-2H are tables and diagrams illustrating an example implementation of the EKEA method according to one aspect of the invention;

DETAILED DESCRIPTION

The present invention encompasses a number of cryptographic methods forming the Entropic Encryption Suite (EES). The first is a key expansion method that is used to expand a symmetric key to generate additional keys (pseudo-randomly). The second method is a hash algorithm which generates a digest from the input message. The third method is a block encryption algorithm which takes a plaintext message and encrypts it to generate a ciphertext message. This third method also allows for the generation of the plaintext from the ciphertext. The fourth method is key scheduler which generates a key sequence. The cryptographic strength of all four algorithmic methods is underpinned by the selection and use of a strong seed-key. The use of a weak seed-key could lead to the early compromise of the information that these methods are designed to protect.

The first of the methods expands a seed key into an expansion key. This method is referred to in this document as the Entropic Key Expansion Algorithm (EKEA) method and this method forms the foundation for the other algorithmic methods. It should be clear that, while the examples provided below uses keys and variable values that are exponents of or multiples of 2, other keys and values may also be used.

To explain the EKEA method, it should be noted that every bit in a key having a bits can be mapped (and accessed) from any combination of bits having b bits where $2^b = a$. Thus, as an example, a key with 8 bits can be accessed using any combination of 3 bits since $2^3 = 8$. For this example, $a=8$ and $b=3$. The advantage of this is that any progression beyond the end of the key is modulo to the beginning of the key. For simplicity, one can designate the first bit in any key or block as the zeroeth ($0^{th}$) bit (i.e., not the first bit). Accordingly, a key having a bits would have 0 to a−1 individual bits.

Figure 1:
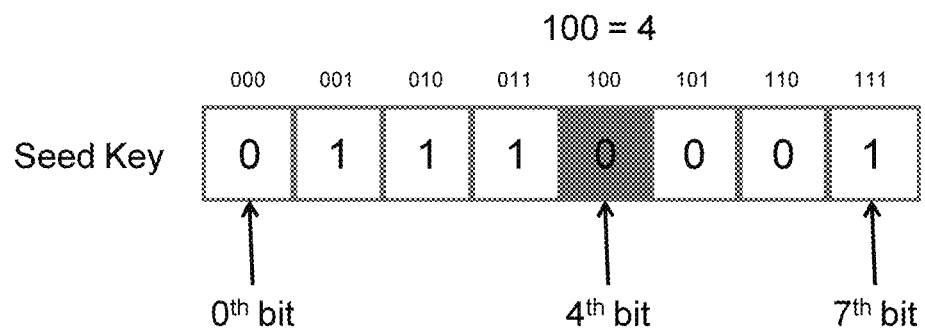
FIG. 1 is a diagram illustrating an example of a Seed Key and how each bit in a Seed Key of a bits is accessible using a b bit combination.

As an example of the above, a key with size of one (1) byte (i.e. equal to eight (8) bits) can have all of its bits accessed by a three (3) bit combination. As noted above, $2^3=8$ with $b=3$ and $a=8$. If a Seed Key (SK) of size of 1 byte is set to 01110001, then a three-bit combination of 100 (i.e. having a decimal value of four 4) would access the 5th bit (see FIG. 1).

The EKEA method is a novel primitive that utilizes the entropy contained within a Seed Key itself to randomly generate an Expansion Key (EK). The EKEA method processes the Seed Key through the following subprocesses to result in the Expansion Key:

Entropic Count Generation
Left Cycle Shifting
Random Bit Reading
Entropic Count Generation (ECG)

The Count Number (CN) is a number that is randomly generated by sampling a bit stream of length b from the Seed Key. Starting from the beginning of the Seed Key (SK), the first b bits are left-shifted (LS) out of the Seed Key and read to determine the CN between 0 and a−1. Once read, the bits are left-shifted back to the end of the Seed Key. An iteration of two left-shifts (one from the front and one into the back) form the process of Left Cycle Shifting (LCS) and is formalized in equation 1a below.

$$CN(SK) = \text{decimal}\left\{\sum_{m=0}^{b} concat[LCS_m(SK)]\right\} \quad (1a)$$

Left Cycle Shifting (LCS)

With the random number of the Count Number, a series of Left Cycle Shifts are performed equal to the Count Number. The counting always starts with zero (0) and increments up to the Count Number. Note that a CN equal to zero (0) means that no cycle shifting is performed for that iteration. This process is described mathematically as follows:

$$LCS_{CN(SK)}(SK) = \sum_{i=0}^{CN(SK)} LCS(SK) \quad (1b)$$

Random Bit Reading (RBR)

Once the Count Number has been reached, one additional left shift is performed to arrive at the bit to be extracted and added to the Expansion Key. This bit is read from the Seed Key and a copy of it added to the Expansion Key. The Expansion Key bits are populated in order such that the first iteration of the EKEA populates the 0th bit of the Expansion Key, the second iteration of the EKEA populates the 1st bit of the Expansion Key and so on. The bit extracted from the Seed Key is then removed from the Seed Key. This process is described mathematically as follows:

$$EK_{Bit} = LS_{in}\{Bit_{Copy}[LS_{out}(LCS_{CN(SK)}(SK))]\} \quad (1c)$$

The Expansion Key is generated by iterating the subprocesses noted above a−1 times. Thus the EKEA method to generate the Expansion Key can thus be expressed mathematically as:

$$EK = \sum_{n=0}^{a-1} concatLS_{n-in}\{Bit_{Copy}[LS_{n-out}(LCS_{CN(SKn)}(SKn))]\} \quad (1d)$$

It should be clear that the process cannot be reversed and, as such, the Seed Key cannot be reformed or derived from the Expansion Key. The EKEA method is unidirectional in generating the Expansion Key as it can only be forward generated from the Seed Key itself. Depending on the values used, this technique allows access to the full key space. Preferably, the value of a is set by the plaintext block size which, preferably, is a multiple of 2.

It should be clear that the EKEA method avoids pattern repetition and key strength decay by removing the sampled bit from the Seed Key. As the Seed Key shrinks, the Count Number can also be set to shrink. Because of this, the Key Size (KS) shrinks as well. The Expansion Key generation process is thus captured in equations 2a–2c:

$$EK = \sum_{n=0}^{a} concatLS_n(CS_{CN(SKn)}(SKn)) \text{ where} \quad (2a)$$

$$CN(SK_n) = decimal\left\{\sum_{m=0}^{KS(Kn)} concat[LCS_m(SK_n)]\right\} \quad (2b)$$

and $$KS(SK_n) = integer[log_2(SK_n)] \quad (2c)$$

One variation of the EKEA method fixes the Key Size to a fixed size b which simplifies the Count Number (CN) algorithm to equation 1a. This avoids the need to calculate the Key Size for each iteration of bit expansion but at the cost of significantly more shifting.

The EKEA method can be summarized as in the following steps:

a) take the first n bits of a seed key and use these n bits to determine a count number (CN)

b) cycle shift the n bits from the front of the seed key to the rear of the seed key c) from the start of the resulting key after the cycle shift, traverse CN positions down the resulting key, with the counting beginning at 0 and not at 1 d) traverse one extra position down the resulting key e) at the bit position pointed to, extract and remove the bit at this resulting position from the key and place this extracted bit in the first available bit position in the expansion key f) since a bit has been removed, the seed key has shrunk by one bit and the position pointed to after extraction is now the front of the seed key g) repeat steps a) to f) until no bits are left in the seed key.

The "front" or start of the seed key can be tracked by way of a pointer that always points at the bit that is at the "front" of the seed key. To traverse a seed key, the pointer merely has to be moved so that it is pointing to a different bit position in the seed key. Thus, for a left shift cycling, the pointer merely moves to the right in the bit positions while moving to the left in the bit positions would implement a right shift cycling.

The results of the above EKEA method can be seen with reference to FIGS. 2A-2H. FIGS. 2A-2H illustrate one example of an implementation of the EKEA method with each step being represented by a figure. For this example, the Seed Key is given as 01110001. Also for this example, a=8 and b=3. For this example, b=n=3. Thus, the first 3 bits of the Seed Key are read. These bits correspond to a value of 3 and, as such, the Count Number (CN)=3. The first n bits are thus read from the front of the Seed Key and rotated/cycle shifted to the back of the Seed Key (see right side of FIG. 2A)

Figures 2A, 2B:
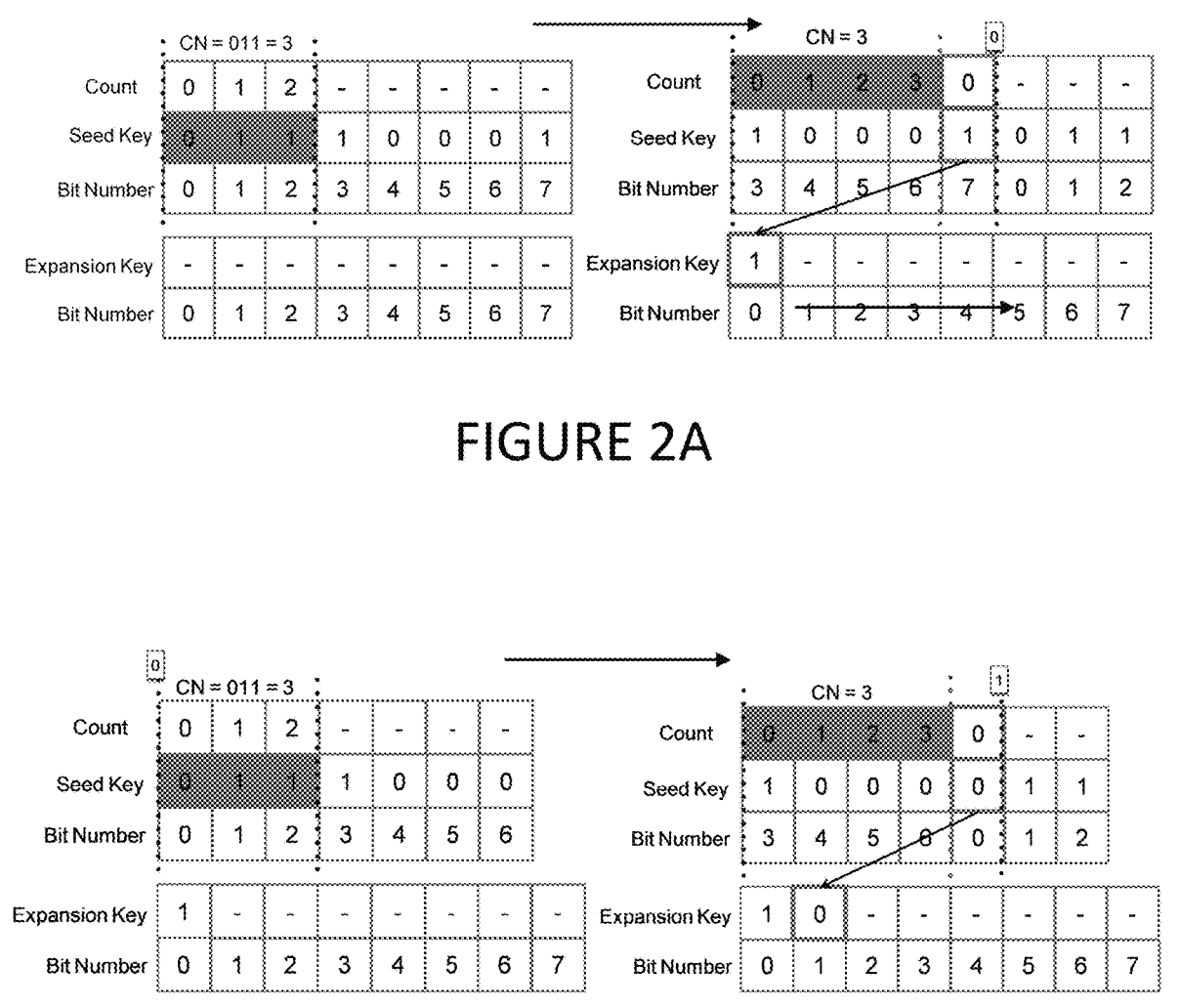

As can be seen from the right side of FIG. 2A, after the first n bits have been cycled to the back of the Seed Key, a traversal of CN=3 positions is executed with the count beginning at 0. Thus, from the right side of FIG. 2A, since the 0th, 1st, and 2nd bits of the seed key were cycled to the rear of the seed key, the count begins at the 3rd bit of the seed key (for easy reference, see the "bit number" index in FIG. 2A). Designating this 3rd bit as count 0, a traversal of the seed key proceeds with the 4th bit being count 1, the 5th bit being count 2, and the 6th bit being count 3.

Once a count of 3 has been reached, an extra position is traversed to the 7th bit. This 7th bit is then extracted (i.e. removed) from the seed key and placed in the first available bit position in the expansion key (i.e. bit position 0 in the expansion key). Because of this removal of the 7th bit, the next bit (i.e. the 0th bit) in the seed key is pointed to. This bit is thus the new start of the resulting seed key.

After extraction of the 7th bit, the process begins anew in FIG. 2B. It should be clear that the left side of FIG. 2B is simply a redrawing of the remaining bits of the left side of FIG. 2A. The beginning of this seed key is thus the 0th bit and the first n bits (with n=3) being read to determine the count number. These n bits are then cycle shifted to the rear of the seed key in the right side of FIG. 2B. Once the cycle shifting has been accomplished, the traversal of the seed key using the count number begins.

For this iteration of the process, since CN=3 again, then the right side of FIG. 2B shows that traversal process results in the 0th bit as being the bit to be extracted and placed in the expansion key. Once extraction has been accomplished, the beginning of the seed key is thus at the 1st bit (see right side of FIG. 2B and the "bit number" index on the right side of FIG. 2B for clarity).

Figures 2C, 2D:
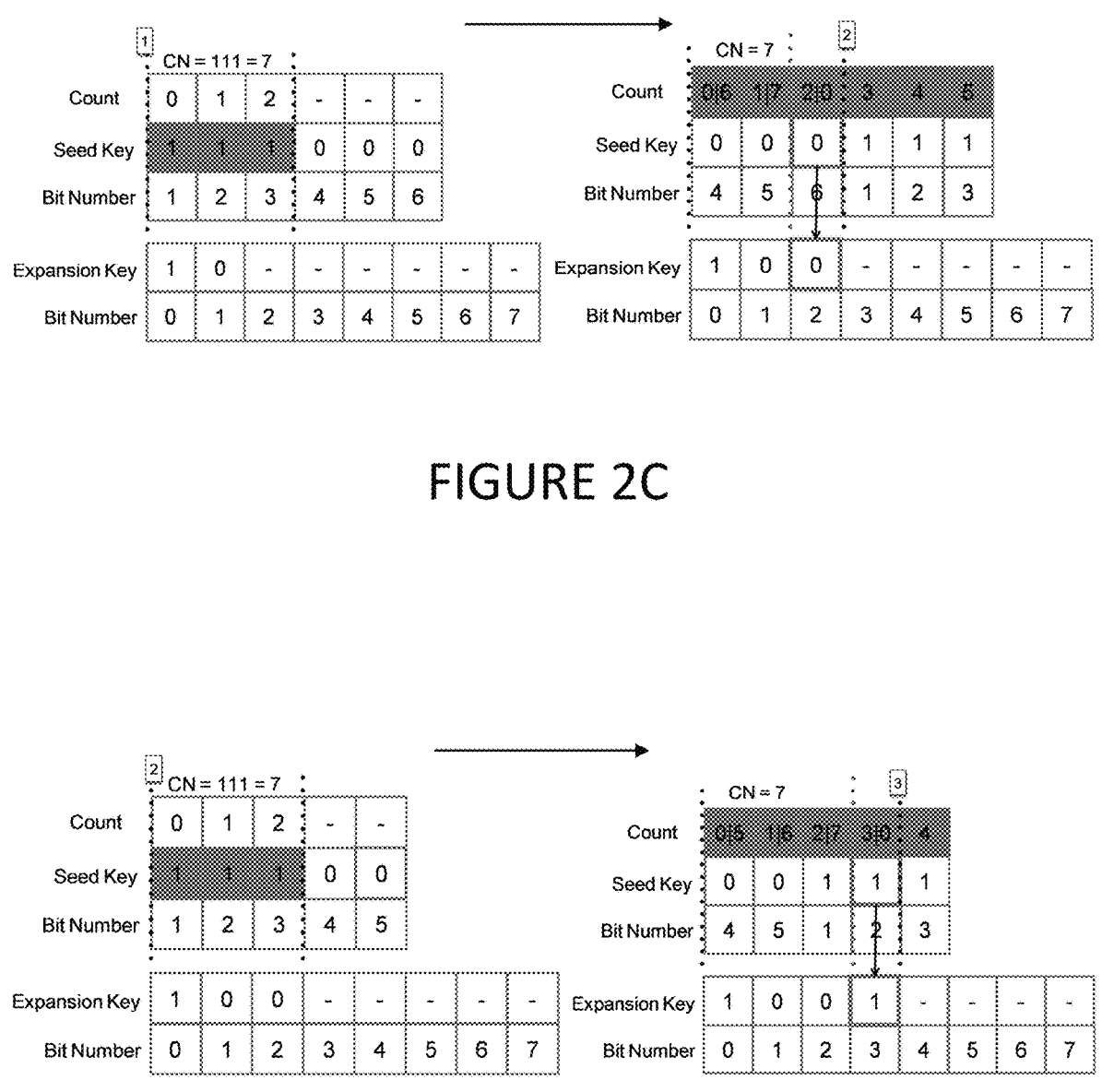
Figure 2E:
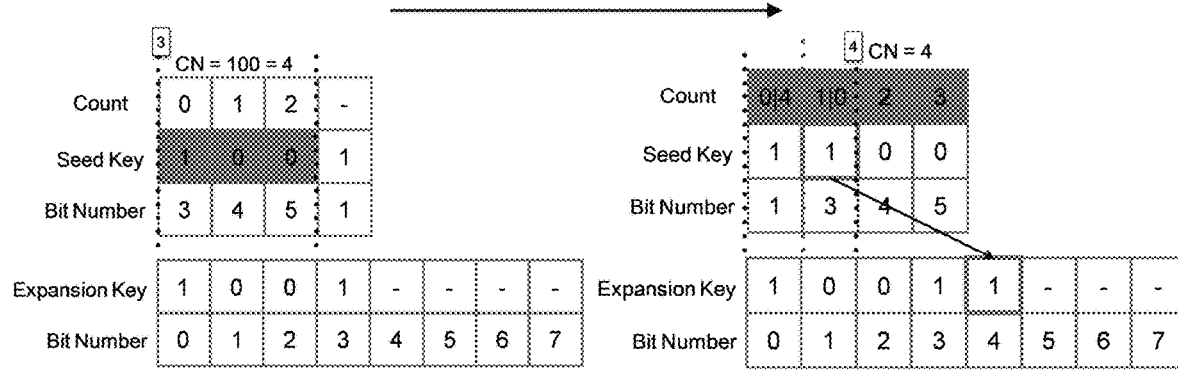

To assist in understanding FIGS. 2A-2H, a marker or pointer to the start of "front" of the Seed Key is provided in the figures. This pointer is shown in the right side of FIG. 2A at the top of the table with a small rectangle and the number 0 inside to denote that this is the 0th iteration of the EKEA method. In FIG. 2B, the left side shows that the pointer indicates the last bit position pointed after the 0th iteration. The right side of FIG. 2B shows that the pointer is now pointing at a different bit position after the 1st iteration of the EKEA method.

For FIG. 2C, the next iteration begins, again, with reading the first n bits of the seed key to yield a count number of 7. Once the count number has been determined, these first n bits are cycle shifted to the rear of the seed key and the traversal of the bits using the count number result proceeds.

The traversal of the bit positions in the right side of FIG. 2C shows that the count begins at the 4th bit being designated count 0. The 5th bit is thus designated as count 1 and so on. It should be clear that the count number traversal of the bit positions wraps around the seed key such that the 4th bit is both count 0 and count 6 while the 5th bit is both count 1 and count 7. Since the 5th bit is count 7, then the 6th bit is the bit to be extracted and placed in the next bit slot in the expansion key. This is shown in FIG. 2C. The beginning of the seed key is thus designated to be, after the bit extraction, the 1st bit (again, see the right side of FIG. 2C and the "bit number" index).

Figure 2F:
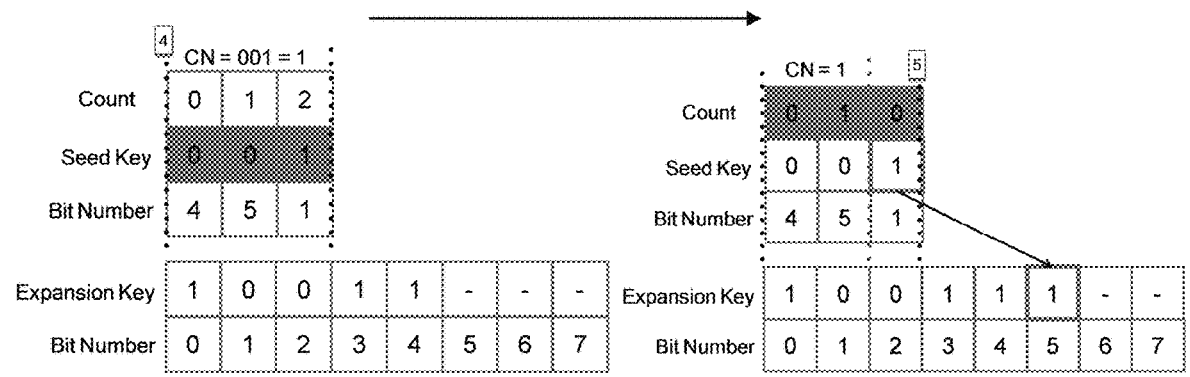
Figure 2G:
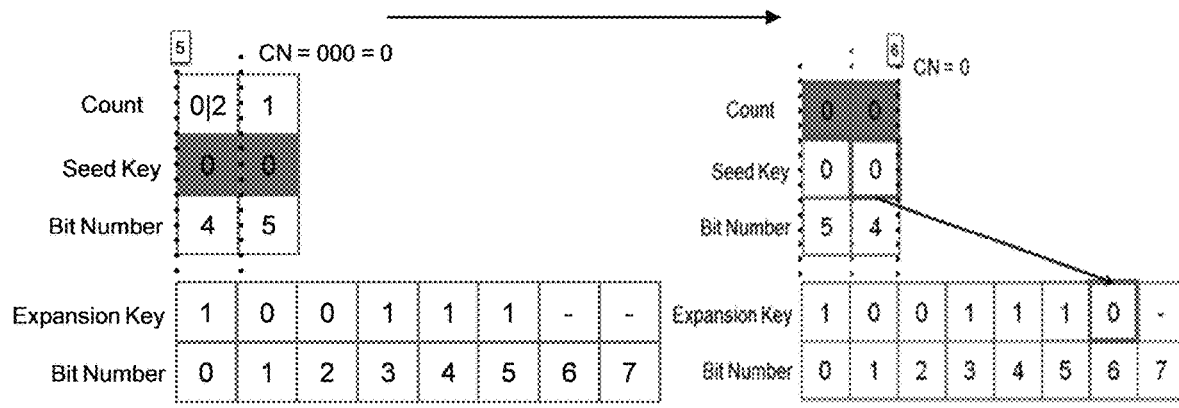

The process proceeds through FIGS. 2D, 2E, and 2F as described above. It should, however, be clear that, for FIG. 2G, this iteration has a count number of 0. Thus, for a count number of 0, the first n bits are still cycle shifted to the rear of the remaining seed key. Of course, if there are less than n bits left in the seed key, these bits are still cycle shifted to the rear of the seed key. Thus, for FIG. 2G, the 4th bit and the 5th bit are the only bits left to determine the count number. Once these are cycle shifted to the rear of the seed key, their sequence is reversed (see the bit number index for the resulting seed key at the right side of FIG. 2G). Since the count number is 0, traversal does not occur for the count number. The 4th bit is then extracted from the right side of FIG. 2G.

Figure 2H:
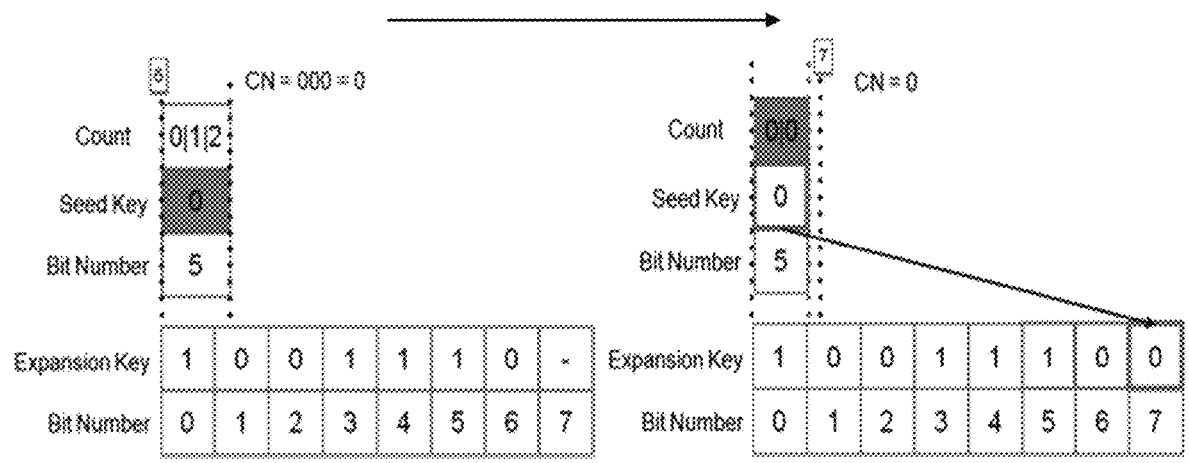

For FIG. 2H, the last bit is extracted. It should be clear that, for the iteration in FIG. 2H, all the steps of the process are still executed and that this execution results in the last bit being extracted and placed in the expansion key.

The result from the example is an expanded key (EK) that has a value 10011100. This expanded key has been randomly generated from the Seed Key. In effect, randomly selecting randomly generated bits (from a stream of bits) generates a new random stream of bits (and thus a new random number). Clearly, the Seed Key can be selected from a subset of any bitstream.

It should be noted that, for the example, b=n=3. Since there were eight bits in the seed key (i.e. a=8), and since $2^b=a$, then the example easily works out with n=3. However, it should be clear that for seed keys which have a bits where a is not a multiple of 2 (i.e. not even) or a is not a direct power of 2, n can be any number. One drawback to using a seed key whose number of bits (i.e. a) is not a power of 2 is that not all of the key space can be directly accessed. However, if a is a power of 2 (i.e. $2^b=a$), using b=n simplifies matters and allows access to the complete key space for that seed key. For clarity, n is the number of bits in the seed key that is used to calculate the count number and the number of bits that are cycle shifted to the rear of the seed key at every iteration of the EKEA method.

One of the disadvantages of the above method as detailed in the example is that the key space is limited to those keys with the same quantity of 0s and 1s as the seed key. This key space represents a significantly smaller key space (in the generation of the Expansion Key) than the size of the Seed Key. That being said, one of the advantages of the EKEA method is that the expanded key will not degrade to a weak key (e.g. an expanded key that are all 0s).

While the above EKEA process works, variants are also possible which may help in expanding the usefulness of the process.

In one variant, the Expanded Key could be modified by performing an XOR operation between the Expanded Key and the Seed Key. This allows access to the full key space. For this variant, the process is adjusted by performing an XOR operation between the Shifted Seed Key (SSK) and the Final Expansion Key (FEK). Both the SSK and the FEK are, of course, functions of the Seed Key (SK) and the Expansion Key (EK). These variables are used to generate the Next Key (NK) per equation 3a:

$$NK = SSK \oplus FEK \tag{3a}$$

In equation 3a, the SSK is a function of the Seed Key and the Expanded Key (which is also a function of the Seed Key). The FEK is solely a function of the SK. To generate the SSK, a count number is drawn from the Expanded Key and used to LCS the SK. The FEK is generated after the Count Number is drawn/calculated from the Expanded Key. Thus, to arrive at the FEK, the first n bits of the Expanded Key are read and this provides the Count Number. These n bits are then cycle shifted to the rear of the Expanded Key. After the cycle shifting, the resulting key is the Final Expanded Key. The count number from the Expanded Key is then used as the number of bits from the Seed Key that are cycle shifted to the rear of the Seed Key. The resulting key is the Shifted Seed Key. Mathematically, these operations can be expressed as:

$$FEK = LCS_0^{CN(EK)}(EK) \tag{3b}$$

$$SSK = LCS_0^{CN(EK)}(SK) \tag{3c}$$

In these equations, CN(EK) is given by equation 1a above. Once the NK has been generated, this NK is then used as the Seed Key and the EKEA method is applied to this Seed Key to generate the new Expanded Key.

While the XOR operation variant grants full access to the key space, this method of key expansion can also result in key strength decay. Key space access and key strength decay can be addressed by expanding the key size to be significantly larger than the plaintext block that it will protect.

In this case, the key size could be made several bits (Δ) larger to a multiple (c) of 2 times the bit size pt of the plaintext block (i.e. the plaintext block is of length pt bits). The Key Size (or the number of bits in the Seed Key) is then expressed as $KS=2^c(pt+\Delta)$, and $d=\log_2[2^c(pt+\Delta)]=c+b$, which represent the bits that must be withdrawn (cycled) to almost access the full key space (minus the Δ bits). The first Key Expansion can be obtained by applying the EKEA method to an SK of size $2^c(a+\Delta)$. For clarity, the variable b is derived from the above equation where a key can be defined as having a bits from any combination of bits having b bits where $2^b=a$.

As we will see, the Expansion Key can be split at least once to generate the two or more encryption/decryption keys. Note that this method will generate two or more keys, where each key, having a bits, has full access to the key space. These keys are balanced between the set of keys (i.e. decreases in 1s in one key is balanced by increases in 1s in one of the sister keys). Coupling the keys maintains key strength but at the cost of increased key size and at least double the encryption cycles. The EKEA process then becomes:

$$EK = \sum_{n=0}^{e} concatLS_n(CS_{CN(SKn)}SKn)) \tag{4a}$$

where $e=2^c(a+\Delta)-1$ and $$CN(SK_n) = decimal\left\{\sum_{m=0}^{d} concat[LCS_m(SK_n)]\right\} \tag{4b}$$

where d=c+b and from which one or more Transmission Keys (TKs) are generated. The Transmission Keys are determined by:

$$TK^e = \sum_{q=(p-1)a}^{pa} concatLS_q(EK_r) \tag{4c}$$

where $e=2^c$ and r=pa−q.

Figure 3:
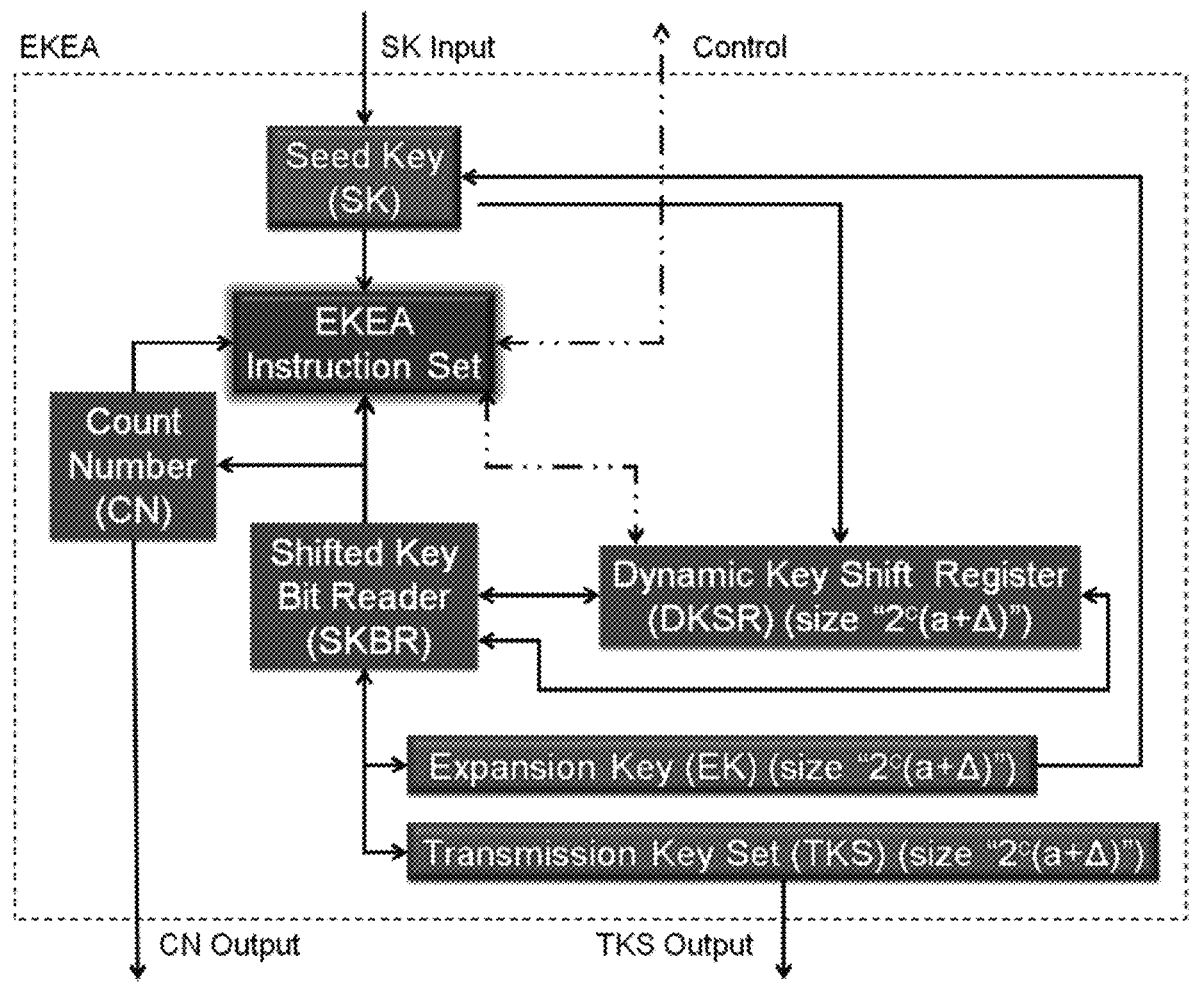
FIG. 3 is a block diagram illustrating a system for implementing the EKEA method.

In one implementation, the Seed Key is loaded into a Dynamic Key Shift Register that performs the shifts on the relevant key stored within. The Dynamic Key Shift Register can take the form of a physical hardware register or it can take the form of a software data structure (e.g. a linked list or a suitably configured software array) for storing bits in a key with each bit occupying a dedicated data slot. This allows for bit shifting and traversing the various bit positions as required by the EKEA method. Such an implementation is illustrated in FIG. 3 where each block is either a data structure for storing a variable (e.g. Count Number) or a data structure for both storing and manipulating a key or variable (e.g. Dynamic Key Shift Register). Note that the EKEA Instruction Set is illustrated in FIG. 3 for clarity to illustrate which variables are used by or adjusted by the EKEA method. As should be clear, each data structure represented in FIG. 3 can be replaced by a physical hardware device that performs that same function as the software data structure.

It should be clear that the Dynamic Key Shift Registers (DKSR) and the Shifted Key Bit Reader (SKBR) in FIG. 3 can perform both Left Shifts and Right Shifts. It should also be noted that the implementation in FIG. 3 illustrates another possible variant for the EKEA method. As will be explained below, the cycle shifting for the EKEA method can be performed as a left shift or as a right shift. Depending on the Seed Key, using the EKEA method with all cycle shifts being left shifts to produce an EK will produce a different Expansion Keys than an implementation where all cycle shifts are right shifts. As will be shown below, having a single SK to produce two EKs (one produced using left shift cycle shifts and one produced using right shift cycle shifts) can result in paired Transmission Keys.

For the implementation in FIG. 3, the Seed Key is initially loaded into the Dynamic Key Shift Register (DKSR). The first bit of the DKSR is left-shifted into the Shifted Bit Reader and determines the direction of expansion to generate the EK (where 0=Left-Shifting and 1=Right-Shifting). Once the EK is generated, the SK is reloaded in the DKSR and sequenced in the opposite direction that was used to generate the EK—this produces the Transmission Key Set (TKs). As such the EK and the TKs are isolated from each other by the opposite (and irreversible) directions of expansion. The TKs can be exported or the generated Count Numbers (along with the Control signals) can be used directly for encryption/decryption. If exported, the TKs can be spliced to produce TKs of size (a+A) where a is the number of bits in the Seed Key.

Once generated, the Expansion Key can be used to replace the original Seed Key and the cycle recommences to generate the next Expansion Key and Transmission Keys.

It should be clear that once the Seed Key has been used in the EKEA method, knowledge of either the SK or the EK is no longer needed as only the TKs can be read. As will be explained below, the EKEA method can be used in an encryption/decryption method and in a hash method. For these two methods, the CN and Control signals are used to sequence the methods. For such implementations, it is possible to reverse engineer knowledge of the Transmission Keys through the CN.

Figure 4:
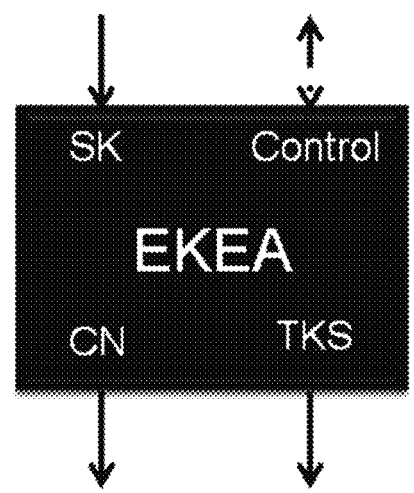
FIG. 4 is a block diagram of a black box implementation of the system illustrated in FIG. 3 and details the inputs and outputs of such a black box implementation.

The block diagram in FIG. 3 is simplified to a black box in FIG. 4. The EKEA method can be used in an encryption/decryption method as well as in a hashing method. In the explanations of these methods below, the EKEA method is simplified into a block.

Depending on how the EKEA method is used and depending on the configuration of the encryption/decryption methods used, variants of the above are possible. As an example of such variants, the Transmission Key sizes could be any size larger than the plaintext block size and could vary in length between the TKs themselves (i.e. each TK could have a different key length). For such a variant, the length of the Transmission Keys could vary randomly between key sets and would be determined through the entropy of the Seed Key.

As noted above, EKEA method may be implemented through software or hardware. With software, the DKSR can be developed with any suitable data structure such as a linked list. In terms of dedicated hardware, the DKSR can be built with suitably sequentially linked J-K or D flip-flops, or with Programmable Logic Arrays (PLAs).

The EKEA method can be used to encrypt blocks of plaintext (PT). As noted above, the size of the plaintext block is preferably of the same size or smaller than that of the Transmission Keys (TKs)

To establish a secure transmission session, the Seed-Key (SK) must be shared between the transmitter and the receiver. The EKEA method is then used to expand the SK to generate the individual set of symmetric Transmission Keys (TKs). A unique set of TKs is used for each block that is transmitted. The Seed-Key or Expansion Keys are never used to encrypt a block as only the expanded TKs are used. It should be clear that, when the EKEA method is used to generate the Transmission Keys, the parameters used by the transmitter and receiver for the EKEA method are the same.

For encryption, the EKEA method is used to generate a new set of TKs to encrypt each block of plaintext. While the EKEA method generates the next key it also uses the Count Number (see equation 2b or 4b) to transform the plaintext into ciphertext. The EKEA based encryption method thus generates a one-to-one map between the plaintext set and the ciphertext and this map changes with each transmission. While similar to a one-time pad (in that each TK is used only once for a transmission), the key space is restricted to that of the TK. For each TK used, the sequencing direction (forward or reverse) of each TK is established by reading the first bit of the TK with a first bit value of 0 denoting a left-shift sequencing while a first bit value of 1 denotes right-shift sequencing.

In the case where two TKs are used, if the first bit of the first TK is read as "0", then left-shift sequencing of the first TK occurs. To generate each bit of the ciphertext (CT) from the plaintext (PT), the following equation denotes the operation:

$$CT_{x-n} = LS_n[LCS_{CN(TKm)}(PT_m)] \quad (5a)$$

For equation 5a, it should be clear that x-n denotes an index to the ciphertext's block number and bit position being encoded with x denoting the block number and n denoting the bit position of the bit being encoded. Thus, $CT_{0-5}$ denotes the bit at bit position 5 in block number 0 of the ciphertext. For further clarity, m=a−n and denotes m as the size of plaintext ($PT_m$) or the Transmission Key ($TK_m$) being used in the encryption. It should be clear that both the full plaintext and the full TK have a bits. Thus, as an example, if both the plaintext and the TK have a size of 10 bits (i.e. a=10) and we wish to encrypt bit 3 of the ciphertext (i.e. n=3), then m=10-3=7. This means that, for the example, a 7 bit subset of the plaintext and of the TK are used to encrypt the ciphertext.

The count number is thus determined based on a subset of the Transmission Key and the actual bit used in the ciphertext is selected from a subset of the plaintext.

The full ciphertext block for block number x is thus generated with:

$$CT_x = \sum_{n=0}^{a-1} concatCT_{x-n} \quad (5b)$$

where, as in equation 5a, x-n denotes an index and not an operation

If the first bit of the second TK yields a 1, then right-shift sequencing occurs where each bit at position n of the ciphertext is derived from the PT through $$CT_n = RS_n[RCS_{CN(TKm)}(CT_{x-m})] \quad (5c)$$

In equation 5c, x−m again denotes an index with x being the block number and m having the same definition as for equation 5a. Thus, to encrypt bit n, the result of the previous encryption is used by taking the encrypted block and using its bits with a right shift to arrive at the final encrypted bit. It should be clear that RS is a Right Shift out of the back of DTSR and RCS is a Right Cycle Shift consisting of an RS out of the back followed by an RS into the front of the DTSR.

The full CT Block is generated with:

$$CT = \sum_{n=0}^{a-1} concatCT_n \quad (5d)$$

It should be clear that, if 2 TKs are used, then there are four possibilities for the first bits of the 2 TKs: 00, 01, 10, 11. The example provided is for the case where the first bits of the 2 TKs equals 01. For completeness, if the first bits of the 2 TKs equal 00, then the PT is encrypted with a LS sequencing of the first TK and a LS sequencing of the second TK. If the first 2 bits of the 2 TKs equal 10, then the PT is encrypted with a RS sequencing of the first TK and a LS sequencing of the second TK. If the first two bits of the 2 TKs equal 11, then the PT is encrypted with a RS sequencing with the first TK and a RS sequencing with the second TK.

It should be noted that, for a more reliable transmission (i.e. to increase availability), the Block Number (BN) may need to be included as a plaintext number to ensure that the Key Expansion remains synchronized between the transmitter (encryption) and receiver (decryption). If, however, this is deemed to be unacceptable, then the BN may be included in the plaintext block and encrypted.

For decryption, the receiver also uses the EKEA method to generate the TK to decrypt the CT that it has received from the transmitter. The decryption method reverses the encryption process by acting on each individual bit of the ciphertext block. It accomplishes this by first generating the Count Numbers (CNs) and then storing these in the Count Number Stack (CNS). The CNs are then popped out of the stack one at a time to determine the decrypted location for the previously encrypted bit.

The decryption process assumes that the receiver has the TKs used in the encryption of the ciphertext and that the receiver and the transmitter have agreed as to which Transmission Key is to be considered as the first or the second Transmission Key. If two TKs were used in the encryption of the ciphertext, then the first read bit of the TKs generates the sequencing directions that are opposite to that of encryption. In this case, the sequencing directions are established by reading the first bit of the TKs. If the first bit is a 1, then left-shift sequencing is used while if the first bit is a 0, then right-shift sequencing is used. Starting with the second TK (if the first bit is a 1), each bit of the PT block is generated with:

$$PT_{y-n} = LS_n[LCS_{CNCm}(CT_m)] \quad (6a)$$

As with equation 5a, the subscript y−n indicates an index with y denoting the ciphertext block number (which runs in reverse order to the x block number used in encryption) and n denoting the bit position in that block of the bit being decrypted. For further clarity, m=a−(n−1) with n denoting the bit position of the bit being decrypted and m denotes the CN reference number in the CNS. It should also be clear that m denotes the bit position of the bit being accessed in the ciphertext. As with equation 5a, it should be clear that both the full plaintext and the full TK have a bits.

To generate the full plaintext block for block number y, the following is used:

$$PT_y = \sum_{n=0}^{a-1} concatPT_{y-n} \quad (6b)$$

For the first TK (if the first bit is a 0), each bit of the PT block is generated with right-shift sequencing where each bit of the PT is derived from the CT using $$PT_n = RS_n[RCS_{CNSm}(PT_{y-m})] \quad (6c)$$

For equation 6c, m=a−(n−1) and denotes the CN reference number in the CNS as well as the CT bit number that is being inserted into the PT block. The full PT Block is generated with $$PT = \sum_{n=0}^{a-1} concatPT_n \quad (6d)$$

As an implementation note, it should be clear that, for both the encryption and decryption methods above, the Count Number [CN(TKm)] is being executed at the same time within the EKEA method to generate the next TK. This causes the Count Number to decrease in bits for every iteration. It should be clear that the Count Number decreases based on equations 2b and 2c above. As can be seen, what results is a logarithmic calculation to determine b based on the remaining PT/CT bits (i.e. m that is always smaller than a).

It should also be clear that, if the last PT block of a message is only partly filled, that PT block can be filled with pseudo random bits prior to being converted into CT block.

Figure 5:
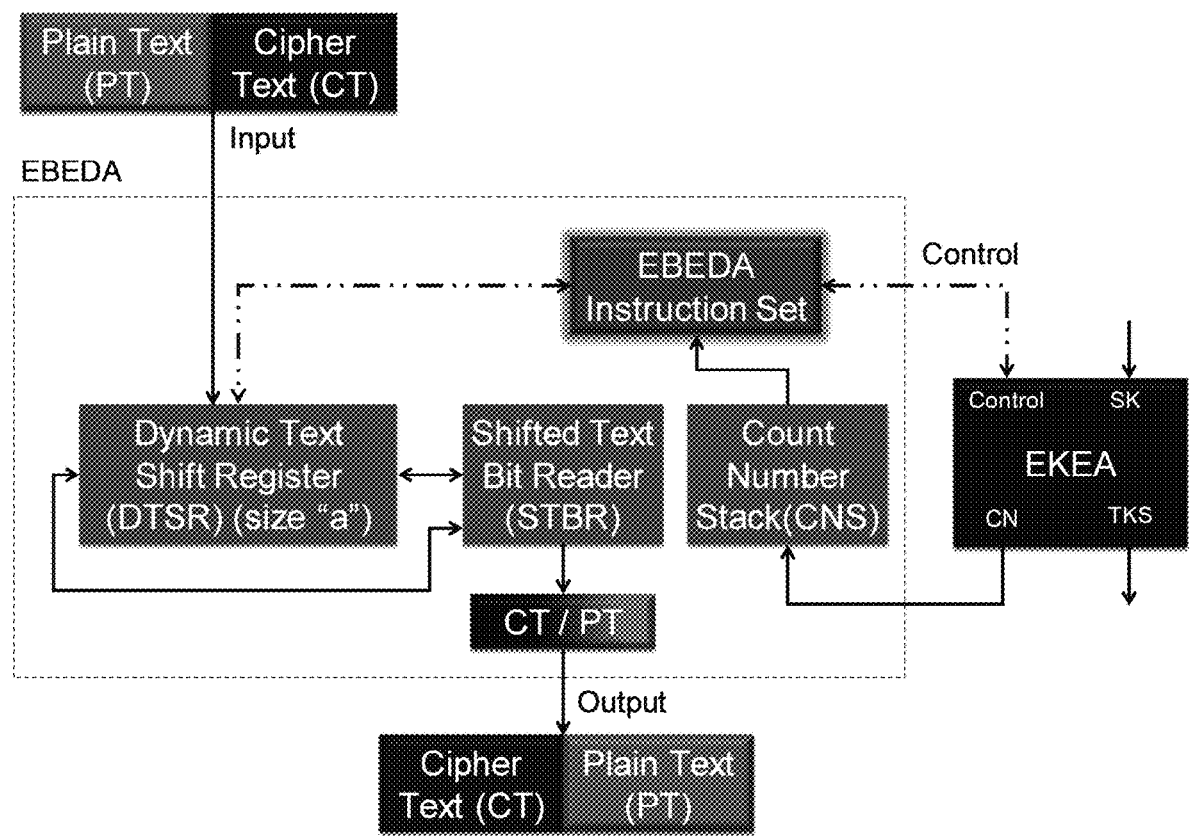
FIG. 5 is a block diagram of a system for implementing the encryption/decryption method detailed in this document.

For an implementation of the encryption/decryption methods, a block diagram of a system is illustrated in FIG. 5. As can be seen, an EBEDA instruction set block for the encryption/decryption instructions/control mechanism is used along with a suitable EKEA method block.

As we can see from FIG. 5, the Count Number Stack exists strictly for decryption. This occurs because of the unidirectional nature of the EKEA method. It should thus be clear that decryption requires that all the count numbers need to be determined prior to reversing the encryption process.

The EKEA method can also be used to generate hashes or hash digests from digital messages. For such a use, the input message can be of any size. The size of the digest message can also be set to any size. The hash algorithm relies on a shared symmetric key rather than on a series of known transformations (e.g. such as MD5, SHA-1, etc. . . . ). Depending on the use of the hash algorithm, the shared symmetric key can be private or public. The key must be private if the hash digest is used for authentication but it can be public if the hash digest is being used to assess the integrity of the original message. In the case of a public key (for message integrity), the key would be included with the digest.

The digest employs the encryption technique of the encryption/decryption method noted above with the additional step that each encrypted (CT) block (known as the Block Hash Digest) is used in an XOR operation with the previous CT block (known as the Cumulative Hash Digest)

to produce the final Hash Digest. Equation 7a is used to generate the Block Hash Digest (BHD):

$$BHD_x = \sum_{n=0}^{a} concatCT_{x-n} \qquad (7a)$$

where x=1 . . . number of blocks.

The Cumulative Hash Digest (CHD) is generated by performing an XOR operation between the previous CHD and the BHD (see equation 7b).

$$CHD_x = CHD_{x-1} \text{ XOR } BHD_x \qquad (7b)$$

For equation 7b, each bit of CHD0 is initialized with a zero (0). The Hash Digest (HD) is thus generated with equation 7c:

$$HD = \sum_{x-1}^{number\ of\ blocks} CHD_{x-1} XORBHD_x \qquad (7c)$$

It should be clear that the hash digest has a size of a bits.

Figure 6:
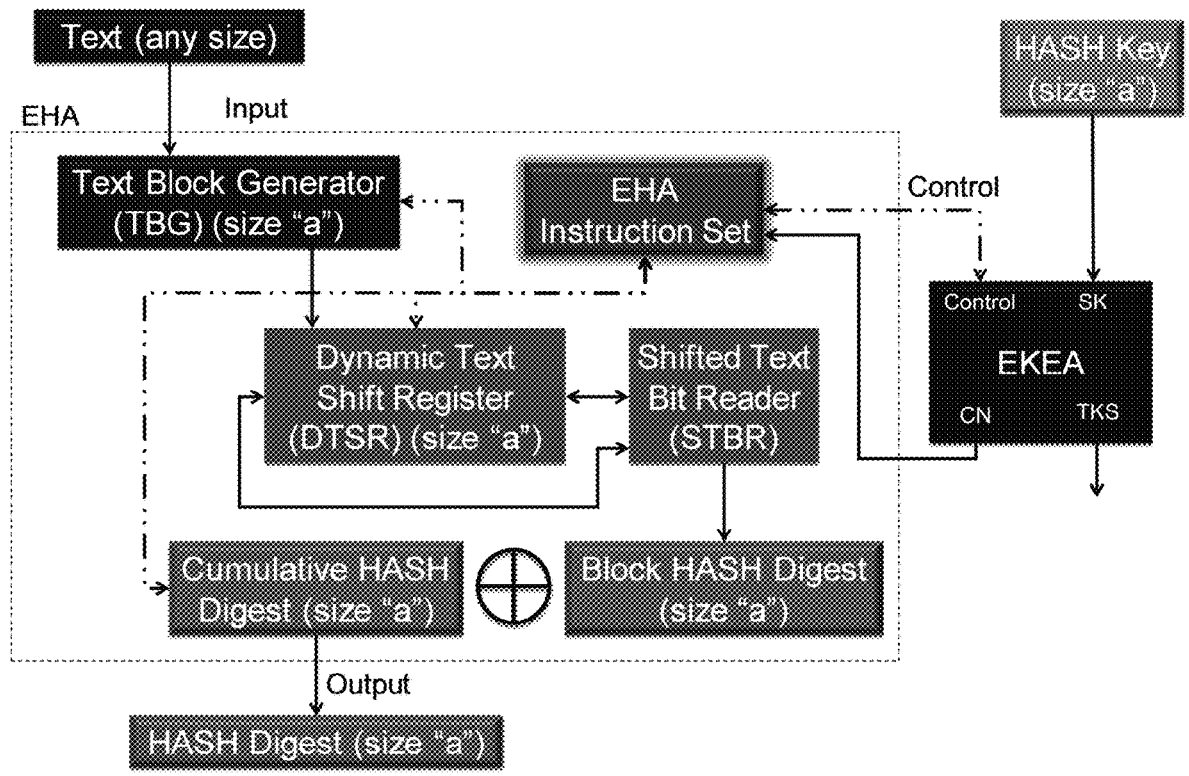
FIG. 6 is a block diagram of a system for implementing the hashing method detailed in this document.
Figure 7:
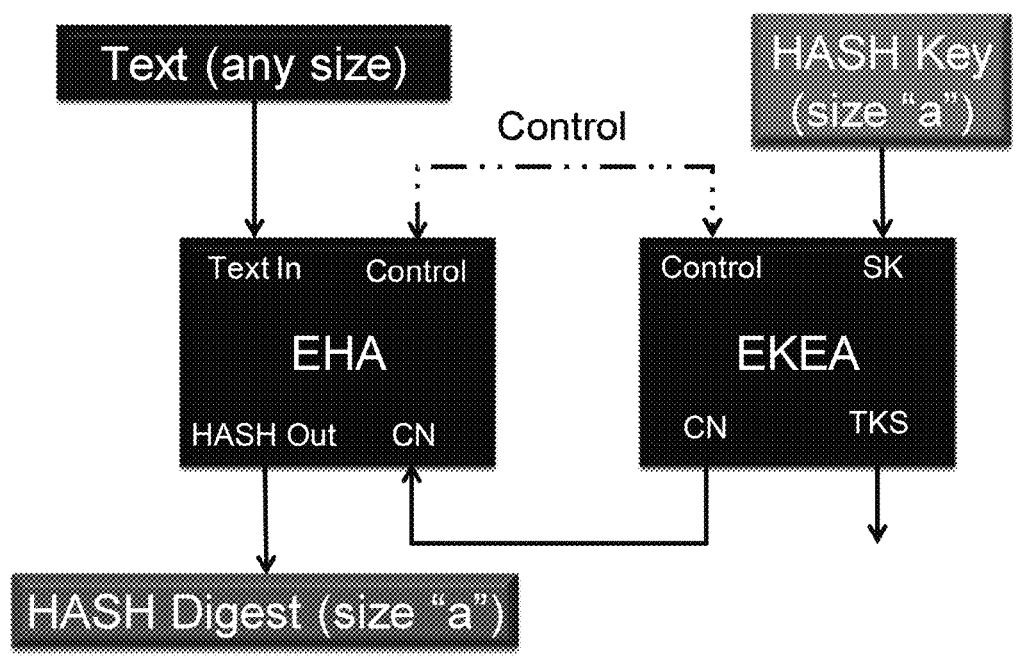
FIG. 7 is a block diagram of a system using the EKEA method black box in FIG. 6 and a block box implementing the hashing method implemented in FIG. 6.

To implement the hashing method noted above, a system such as that illustrated in FIG. 6 may be used. As can be seen, the system in FIG. 6 is similar to the system shown in FIG. 5. However, the system in FIG. 7 does not have a Count Number Stack and has an XOR function for performing an XOR operation between the CHD and the BHD.

In this implementation, each Block Hash Digest is sequentially XORed with the Cumulative Hash Digest. After the final XOR operation with the last Block Hash Digest, the Cumulative Hash Digest is then outputted as the final Hash Digest.

The EKEA method can also be used to generate a key scheduler. The underlying principle of this is accomplished by XORing the initial Count Number (of the existing cycle) with the Count Number of the previous cycle, thus producing a final Count Number for the existing cycle (see FIG. 8). This final Count Number is fed back to the EKEA to determine the sequenced bit to be withdrawn in that cycle.

Figure 8:
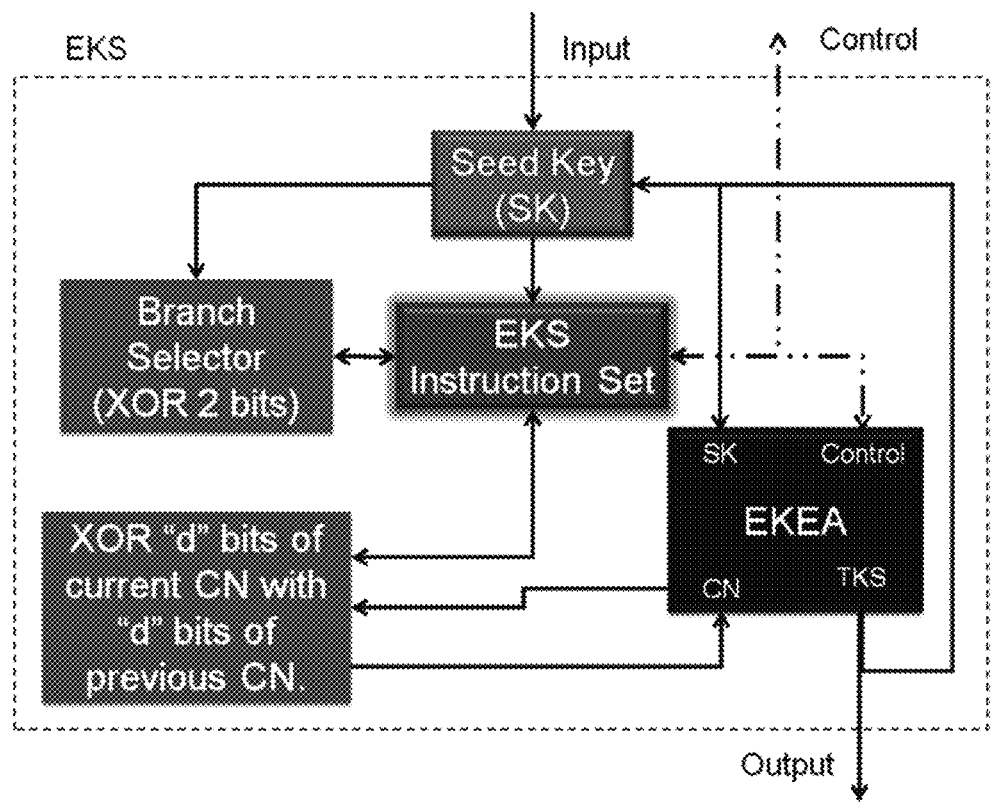
FIG. 8 is a block diagram of a system using the EKEA method black box in FIG. 3 and XORing the initial CN output from the current cycle with the CN of the previous cycle to determine the final CN of the current cycle.

As a variant of the EKEA method, the feature illustrated in FIG. 8 can be used to introduce additional entropy in the system. Such additional entropy can disrupt symmetries within keys as such symmetries can cause weaknesses or degenerations in key strength. For each key expansion cycle, two (2) bits are sequentially XORed and this operation determines which branch will be followed for the expansion. From FIG. 8, it should be clear that the 2 bits to be XORed with each other are from the Seed Key and that these bits determine the direction of shifting. The four options of such a branch selector feature, and the branch selected, are as follows:

00: LS EKEA
01: RS EKEA
10: LS (d bits)
11: RS (d bits)

For a LS or RS branch (i.e. the 2 bits from the SK are either 10 or 11), d bits from the current CN and from the previous CN are XORed with each other, and that number of left or right shifts are executed and the result is fed into the EKEA as the CN. If, however, the 2 bits from the SK are 00 or 01, then the shifting performed by the EKEA method is either left shifting or right shifting as noted above.

The result is a key scheduler that randomly moves throughout the Key Space generating a pseudo-random sequence of keys. The EKS Block Diagram (FIG. 8) shows that the first two bits of the branch selector feature are initialized with the SK (as is the CN). The final-current CN is determined by XORing the initial-current CN with the previous CN.

It should be clear that the various EKEA method components may be used for other cryptographic uses. As an example, the Transmission Keys may be used to generate the so-called "salt" for other well-known hash algorithms (e.g. SHA). For such a use, the Transmission Keys would need to be spliced to the quantity (in bits) of "salt" needed by these algorithms.

It should be clear that the various methods described above have many uses. They can be implemented to encode/encrypt an incoming bitstream to result in an encoded bitstream. The encoded bitstream can then be transmitted to a receiver and, at the receiver end, the incoming bitstream can be decoded to result in a decoded bitstream.

It should also be clear that the methods outlined above can be implemented using a general purpose computing device or they could be implemented using a dedicated computing device such as an ASIC (application specific integrated circuit). Similarly, the methods can be implemented as one or more software modules that are called by specific programs as necessary.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C #"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

I claim:

1. A method for securely exchanging a secret message through a communication channel between two agents by transforming a binary plain text block into a binary cipher text block (and subsequently transforming said binary cipher text block back into said binary plain text block) by utilizing the count numbers generated by transforming a binary seed key into a binary expansion key, the method comprising:
   a) ensuring that prior to the agents communicating, in a secure environment or through a secure channel, the agents generate and exchange said binary seed key of length n;
   b) initiating a secure communication, the sending agent drafts said secret message in their language of choice, and through a text to binary encoder, such as ASCII, converts said secret message into said binary plain text block;
   c) storing said binary seed key in an ordered sequential data structure sk;
   d) ensuring said binary expansion key is an empty ordered sequential data structure ek;
   e) ensuring an empty ordered sequential data structure cns is initialized to store said count number cn;
   f) pointing a pointer psk at the bit at a front of said seed key data structure sk;
   g) reading a first a bits of said seed key data structure sk from said front of said seed key data structure sk to determine said count number cn, where both a and cn are natural numbers;
   h) inserting said count number cn in the back of said ordered sequential data structure cns;
   i) shifting the first a bits from said front to a back of said seed key data structure sk;
   j) shifting a number of cn bits from said front to a back of said seed key data structure sk, cn being equal to said count number;
   k) extracting a bit bsk pointed to by said pointer psk at the front of said seed key data structure sk and placing said bit bsk into the back of said expansion key data structure ek;
   l) by removing the bit bsk extracted in step k) from said seed key data structure sk, thereby shrinking this ordered sequential data structure by one;
   m) repeating steps f)-l) until all bits in said seed key data structure sk have been transferred into said expansion key data structure ek and all said count number cn are inserted into the back of said ordered sequential data structure cns;
   n) storing said binary plain text block in an ordered sequential data structure pt;
   o) ensuring said binary cipher text block is an empty ordered sequential data structure ct;
   p) pointing a pointer ppt at the bit at a front of said plain text data structure pt;
   q) extracting a said count number cn from the front of said ordered sequential data structure cns;
   r) shifting a number of cn bits from said front to a back of said plain text data structure pt, cn being equal to said count number;
   s) extracting a bit bpt pointed to by said pointer ppt at the front of said plain text data structure pt and placing said bit bpt into the back of said cipher text data structure ct;
   t) by removing a bit bpt extracted in step s) from said plain text data structure pt, thereby shrinking this ordered sequential data structure by one;
   u) repeating steps p) to t) until all bits in said plain text data structure pt have been transferred into said cipher text data structure ct;
   v) having formed said cipher text block by completing step u), transferring said cipher text block through said communications channel to said receiving agent;
   w) receiving said cipher text block from said communication channel, said receiving agent transforms said cipher text block back into said plain text block by performing steps c) to m) to generate said count number cn to populate said ordered sequential data structure cns, then performing steps n) to u) while substituting said plain text data structure with said cipher text data structure and reversing the direction of extraction (from back to front) of said count number cn of said ordered sequential data structure cns in q) and reversing the direction of shifting (from back to front) of now said cipher text data structure at r);
   x) having converted said cipher text block back into said plain text block in step w), converting said plain text block back into said secret message through the use of said encoder (such as ASCII);
   y) having reformed said secret message, said receiving agent has received said secret message from said sending agent;
   z) continuing said exchange of said secret messages, as required, the agents may alternately take on the roles of sending agent and receiving agent and repeat the steps b) to y) to securely transmit said secret messages;
wherein when executing step j) and r), a count to said cn positions begins said count from 0.

2. The method according to claim 1, wherein a key size for said seed key is larger than a size of a plain text block to be encrypted.

3. The method according to claim 1, wherein said seed key, expansion key, plain text block, and cipher text block are stored and manipulated in said method using a multiple bit hardware register.

4. The method according to claim 1, wherein said seed key, expansion key, plain text block, and cipher text block are stored and manipulated in a multiple bit software data structure, such as linked lists or arrays.

5. The method according to claim 1, wherein said seed key, expansion key, plain text block, and cipher text block are stored and manipulated by computer readable media having encoded thereon computer readable and computer executable code.

6. The method according to claim 1, wherein said seed key, expansion key, plain text block, and cipher text block are stored and manipulated using a Programmable Logic Array (PLA).

7. The method according to claim 1, wherein shifts in said method are either left or right cycle shifts or combinations thereof.

8. The method according to claim 1, wherein, for at least one iteration of said method, after step g), an XOR operation is performed between said count number and a previous count number to result in a final count number for use as the count number in steps h).

9. The method according to claim 1, wherein said count numbers generated while transforming said seed key into said expansion key are stored and re-used to transform additional plain text blocks into corresponding additional cipher text blocks, and stored and re-used to transform these said additional binary cipher text blocks back into these said additional binary plain text blocks.

10. The method according to claim 1, whereby the expansion key generated in step k) is itself expanded to generate a new set of count numbers which are used to transform additional plain text blocks into cipher text blocks, and used to transform these said additional binary cipher text blocks back into these said additional binary plain text blocks.

* * * * *